Patented Aug. 30, 1927.

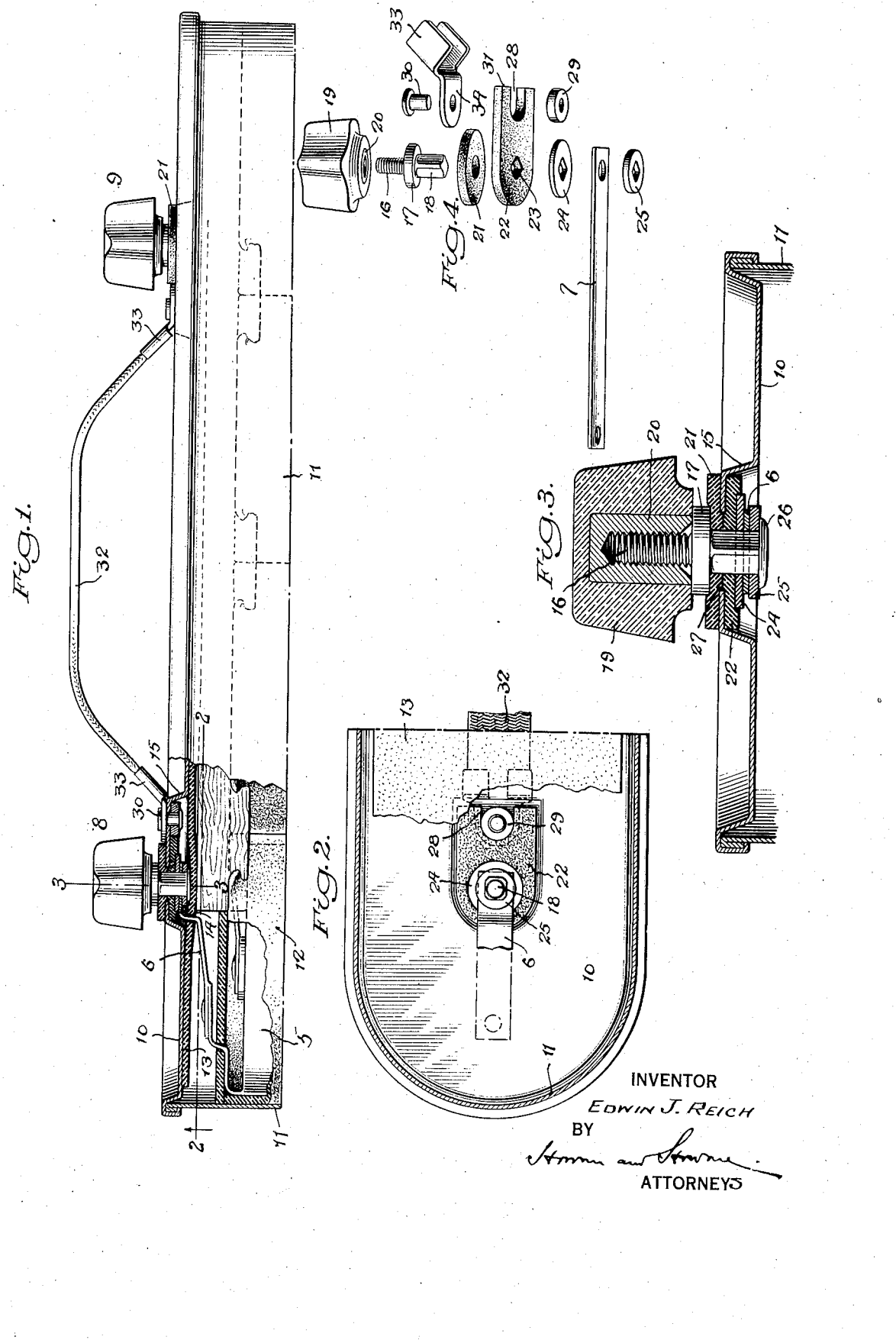

1,640,617

UNITED STATES PATENT OFFICE.

EDWIN J. REICH, OF BROOKLYN, NEW YORK, ASSIGNOR, BY MESNE ASSIGNMENTS, TO NATIONAL CARBON COMPANY, INC., OF NEW YORK, N. Y., A CORPORATION OF NEW YORK.

DRY BATTERY.

Application filed May 22, 1923. Serial No. 640,690.

My invention relates to dry batteries, and particularly to batteries of the multi-cell type. The object of my invention is to provide an improved terminal and handle mount for a battery of this character.

In the accompanying drawings—

Fig. 1 is a broken side elevation of portion of a multi-cell battery unit to which my invention is applied in one form;

Fig. 2 is a section on the line 2—2, Fig. 1;

Fig. 3 is a section on the line 3—3, Fig. 1, drawn to a larger scale; and

Fig. 4 is a dropped perspective of the elements to which my invention relates.

Inasmuch as the general construction of the battery and its casing do not enter into my invention, I have illustrated only the cover and the adjacent part of the casing body, reference being had to the copending application of Allen T. Baldwin, filed herewith, for a fuller disclosure of the general battery construction. It suffices to state that in the form here shown the unit comprises a group of four battery cells 5, arranged within the sealed, metallic casing, and connected in series with each other and by suitable straps 6 and 7 to the exposed terminals 8 and 9.

The terminals are carried by the metal cover 10 of the casing body 11, the conductors of the battery cells being insulated from the casing body by the several cell jackets 12 and the cover lining 13. The straps 6 and 7 by which the end cells of the series are connected to the terminals extend through slots 14 in the cover lining 13, and into raised, non-circular bosses 15. The space afforded within the bosses above the cover lining 13 accommodates the means by which the post terminals are secured in position.

Each binding terminal comprises a post having a threaded outer end 16, an abutment flange 17, and a non-circular shank 18, the latter passing with ample clearance through a hole in the boss 15 into the space between the lining 13 and the inner surface of the boss. Threaded on the outer end 16 of the post is a thumb nut 19 for clamping a wire or connector, which is engaged between the abutment flange 17 and the metal bushing 20 embedded in the thumb nut. Underlying the flange 17 and spacing the latter from the cover is an insulating washer 21 pierced to permit the stem 18 of the post to pass therethrough. Underlying the cover is a second insulating washer 22 pierced at 23 to accommodate the stem 18 of the post and shaped to the non-circular contour of the latter. A metal washer 24 underlies the washer 22 and forms a bearing on one side of the connector strip 7, which is in turn faced on its opposite side by the washer 25. After assembly on the cover in the manner indicated, the shank 18 of the post is spread as at 26 (Fig. 3) beneath the washer 25. At the same time the parts are subjected to sufficiently heavy pressure to deform the washers 21 and 22, the areas of which in register with the hole in the cover 10 being pressed toward each other to such an extent as to form in effect a bushing which lines the hole through the cover and thus maintains the stem of the post insulated from the cover. The bushing effect is indicated at 27 (Fig. 3) where the parts are drawn to a larger scale. Incidentally the heavy pressure exerted during the riveting operation insures a good contact between the post and the connecting strap 7 through the washers 24 and 25, which face the strap end.

Inasmuch as the post is subject to torsional strains during the manipulation of the button 19, there is danger of its rotation—thus placing undesirable strains on the connecting strap 6 or 7. To prevent this the washer 22 is extended to conform to the inner outline of the boss 15. At one end it is notched at 28 to embrace a metal washer 29 held in fixed position by the rivet 30: Since the hole 23 in the washer 22, through which the stem 18 of the post passes, conforms to the non-circular shape of the latter, the post is held against rotation with respect to the washer, while the washer in turn is held against angular displacement by its engagement with the fixed washer 29 in notch 28. It will be noted furthermore that the inner contour of the boss 15 is in itself non-circular, and that the squared end 31 of the washer 22 bearing against the squared end of the boss recess, would in itself suffice to prevent angular movement of the washer 22, in the absence of an abutment such as the washer 29.

The handle 32 for the battery unit comprises a length of flexible fabric, such as braid, the ends of which are gripped by a clip 33 having an integral lug 34 pierced to receive the rivet 30. The handle is thus firmly secured to the cover.

The construction described affords a secure mounting of the terminal post, which is not only held against rotation, but effectively insulated from the casing. It also insures good electrical connection between the stem of the post and the end of strap 6 or 7. The parts on the inner face of the cover are maintained within the space between the cover lining 13 and the cover, and the lining is not materially distorted, but lies flat against the inner surface of the cover—in which position it is held during assembly by the offsetting of the straps 6 and 7 which pass through the slits 14 in the lining. The parts are readily made and assembled.

Various modifications in detail of construction and arrangement of parts will readily occur to those dealing with the problem, which do not depart from what I claim as my invention. For example, while both of the washers 21 and 22 may be of deformable insulating material, the desired bushing effect may be accomplished by forming the washer 21 of material more easily deformable than the washer 22. In this case the bushing effect is caused by the deformation of the washer 21 alone, while the more rigid material of the washer 22 serves more efficaciously to prevent swivelling of the shank of the post therein.

I claim—

1. A battery having a metal casing pierced to receive a terminal, a binding post having a shank adapted to pass through the aperture in the casing, insulating washers on the shank and facing respectively the outside and inside casing wall, said shank being spread to rivet the parts together and being of non-circular contour, the aperture in one of the washers through which the shank passes being shaped to the contour of the latter, together with means for holding said washer against angular displacement, said means consisting of a rivet held member, the insulating washer being notched to straddle said member.

2. A battery casing comprising a metal casing pierced to receive a binding terminal, a binding post having a shank extending with clearance through the aperture in the casing, washers arranged on said shank against the inner and outer faces respectively of the casing wall, said shank being spread to hold said parts assembled on the casing, a member secured to the casing in proximity to the binding post, one of the insulating washers engaging said member to prevent rotation of said washer.

3. A battery having a metallic casing apertured to receive a terminal post, a binding post having a non-circular shank projecting through said aperture into the interior of the casing, a member passing through the casing wall in proximity to the post, and a washer on the post shank within the casing, said washer engaging the shank to hold the same against rotation with respect thereto, and itself engaging said proximate member within the casing to prevent angular displacement of the washer.

4. A battery casing comprising a cover member having within its area a raised boss apertured to receive a binding terminal, a binding post having a non-circular shank extending with clearance through the aperture in the boss, insulating washers arranged on said shank against the inner and outer faces respectively of the boss, one of said washers being pierced to the contour of the shank of the binding post, said shank being offset to rivet the parts to the boss, a member secured to the boss adjacent the terminal and engaging the washer with shaped aperture to hold said washer against angular displacement.

In testimony whereof I have signed my name to this specification.

EDWIN J. REICH.